US012306557B2

(12) United States Patent
Takami

(10) Patent No.: US 12,306,557 B2
(45) Date of Patent: May 20, 2025

(54) SHUTTER MECHANISM, POWDER CONTAINER, AND DEVELOPING DEVICE

(71) Applicant: Nobuo Takami, Kanagawa (JP)

(72) Inventor: Nobuo Takami, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/599,287

(22) Filed: Mar. 8, 2024

(65) Prior Publication Data

US 2024/0310753 A1 Sep. 19, 2024

(30) Foreign Application Priority Data

Mar. 17, 2023 (JP) ................................ 2023-042945

(51) Int. Cl.
*G03G 15/08* (2006.01)

(52) U.S. Cl.
CPC ..... *G03G 15/0886* (2013.01); *G03G 15/0872* (2013.01); *G03G 2215/0692* (2013.01)

(58) Field of Classification Search
CPC ....................... G03G 15/0872; G03G 15/0886
USPC ................................ 399/106, 107, 119, 120
See application file for complete search history.

(56) References Cited

U.S. PATENT DOCUMENTS 8,948,660 B2 * 2/2015 Baker ................ G03G 15/0886 399/258
9,176,423 B2 * 11/2015 Ota .................... G03G 15/0886
9,477,177 B2 * 10/2016 Leemhuis .......... G03G 15/0886
11,650,536 B2 * 5/2023 Kashiide ............ G03G 21/1676 399/262
11,693,332 B2 * 7/2023 Tanaka ............... G03G 15/0867 399/106
11,921,440 B2 * 3/2024 Shimada ............ G03G 15/0886
2010/0129118 A1 5/2010 Kimura et al.
2011/0222871 A1 9/2011 Suzuki et al.
2012/0195645 A1 8/2012 Takami et al.
2016/0004184 A1 1/2016 Kikuchi et al.
2021/0080856 A1 3/2021 Hashikawa et al.

FOREIGN PATENT DOCUMENTS

JP 2009-134267 A 6/2009
JP 2018-116298 A 7/2018

* cited by examiner

*Primary Examiner* — Hoan H Tran
(74) *Attorney, Agent, or Firm* — XSENSUS LLP

(57) ABSTRACT

A shutter mechanism includes an opening, an opening and closing part attached to the opening and openable and closable, a first fitting part disposed at one end with reference to a center of the opening in an open direction of the opening and closing part to move in the open direction to make engagement, a second fitting part disposed at another end opposite the one end with reference to the center of the opening to move in the open direction to make engagement, the first fitting part and the second fitting part detachably attached to a powder container containing a powder used to form an image, the first fitting part and the second fitting part used for positioning in a direction intersecting with the open direction, and a butt face orthogonal to the open direction.

9 Claims, 7 Drawing Sheets

SHUTTER MECHANISM, POWDER CONTAINER, AND DEVELOPING DEVICE

CROSS-REFERENCE TO RELATED APPLICATION

This patent application is based on and claims priority pursuant to 35 U.S.C. § 119(a) to Japanese Patent Application No. 2023-042945, filed on Mar. 17, 2023, in the Japan Patent Office, the entire disclosure of which is hereby incorporated by reference herein.

BACKGROUND

Technical Field

Embodiments of the present disclosure relate to a shutter mechanism, a powder container provided with the shutter mechanism, and a developing device provided with the shutter mechanism.

Background Art

In the related art of image forming apparatuses that adopt electrophotography, some technologies or configurations are proposed in which toner is supplied by a granular-material conveyor from a toner bottle, which serves as a granular material container or powder container and contains toner that is a powder or granular material, to a developing device.

Such a toner bottle is arranged in the developing device or the granular-material conveyor in an attachable and detachable manner, and is required to be positioned with a high degree of precision in order to prevent, for example, the leakage of the powder from a supply path when the powder is supplied.

Further, developing devices have been proposed each of which is provided with a shutter mechanism having a sliding shutter to block the port for toner supply of the developing device attachable to and detachable from an image forming apparatus. The developing device has a connecting portion connected to a toner outlet of the image forming apparatus. The connecting portion is fixed to the developing device and the shutter mechanism is arranged downstream from the connecting portion under normal operating conditions such that toner does not leak at the port for toner supply of the developing device even if the developing device is to be detached from the image forming apparatus.

SUMMARY

Embodiments of the present disclosure described herein provide a shutter mechanism including an opening, an opening and closing part attached to the opening and openable and closable, a first fitting part disposed at one end with reference to a center of the opening in an open direction of the opening and closing part to move in the open direction to make engagement, a second fitting part disposed at another end opposite the one end with reference to the center of the opening to move in the open direction to make engagement, the first fitting part and the second fitting part detachably attached to a powder container containing a powder used to form an image, the first fitting part and the second fitting part used for positioning in a direction intersecting with the open direction, and a butt face orthogonal to the open direction. In the shutter mechanism, the butt face contacts the powder container when the first fitting part and the second fitting part engage with the powder container. In the shutter mechanism, the butt face contacts the powder container in a direction parallel to an engaging direction of the first fitting part and the second fitting part. In the shutter mechanism, the engaging direction of the first fitting part and the second fitting part are parallel to the open direction of the opening and closing part.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
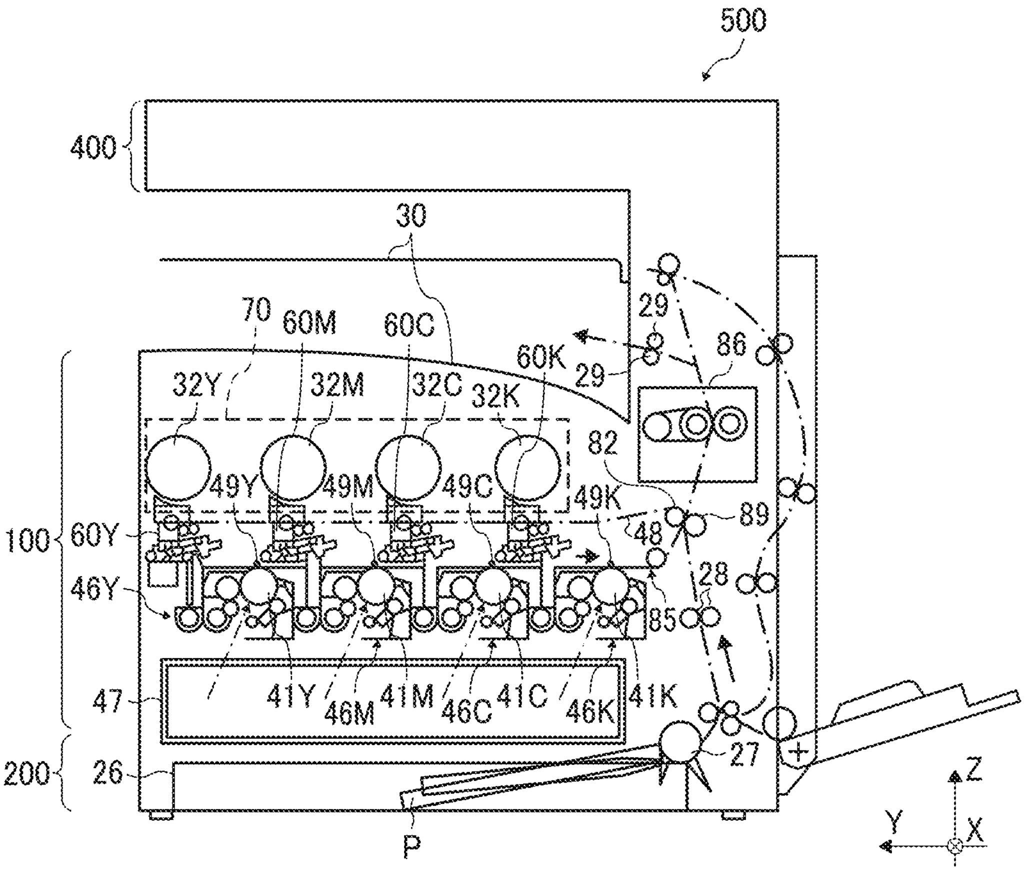
FIG. 1 is a diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to limit the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure are described below step by step with reference to the drawings. In the description of the embodiments, like reference signs are given to elements having similar functionality or configuration, and overlapping description may be omitted where appropriate. The drawings may be simplified or partially omitted to aid the understanding of a particular configuration.

In the following description, the X-axis direction, the Y-axis direction, and the Z-axis direction are perpendicular to each other. The X-axis direction and the Y-axis direction are illustrated as horizontal directions, and the Z-axis direction is illustrated as the vertical direction.
However, no limitation is intended thereby.

FIG. 1 is a schematic diagram of an electrophotographic tandem color copier 500 according to an embodiment of the present disclosure. Such an electrophotographic tandem color copier serves as an image forming apparatus and may be referred to simply as a copier 500 in the following description. In the following description, the suffixes Y (yellow), M (magenta), C (cyan), and K (black) that are given to components or elements indicate to what color each of those components or elements corresponds, and may be omitted where appropriate. The copier 500 according to the present embodiment includes a printer unit 100 that is a main unit of the copier in which image forming units 46Y, 46M, 46C, and 46K are arranged in parallel and form toner images of multiple colors including Y (yellow), M (magenta), C (cyan), and K (black). The image forming units 46Y, 46M, 46C, and 46K are provided with a plurality of modules that are attachable to and detachable from the printer unit 100. In an alternative embodiment of the present disclosure, the copier 500 may be a monochrome copier.

Typically, the copier 500 includes the printer unit 100, a sheet feeder 200, and a scanner unit 400 arranged above the printer unit 100. In the following description, the sheet feeder and the scanner unit may be referred to as a sheet feeding table and a document reading device, respectively.

A toner container holder 70 is arranged at an upper portion of the printer unit 100 to hold four detachable and replaceable toner containers 32Y, 32M, 32C, and 32K that serve as four powder containers and handle multicolor toner including yellow (Y), magenta (M), cyan (C), and black (BK). Under the toner container holder 70, an intermediate transfer unit 85 is arranged.

The intermediate transfer unit 85 according to the present embodiment includes the intermediate transfer belt 48 that serves as an intermediate transferor, four primary-transfer bias rollers 49Y, 49M, 49C, and 49K, a secondary-transfer backup roller 82, a plurality of tension rollers, and an intermediate-transfer cleaning device. The intermediate transfer belt 48 is stretched and supported by the above-described multiple rollers, and is seamlessly moved in the direction indicated by an arrow in FIG. 1 as the secondary-transfer backup roller 82, which is one of the multiple rollers, is driven to rotate.

In the printer unit 100, four image forming units 46Y, 46M, 46C, and 46K that handle toner images of yellow, magenta, cyan, and black colors are arranged in parallel, so as to face the intermediate transfer belt 48. Under the four toner containers 32Y, 32M, 32C, and 32K, four toner supply devices 60Y, 60M, 60C, and 60K that serve as powder supply devices corresponding to the toner containers of the respective colors are arranged. The toner supply devices 60Y, 60M, 60C, and 60K supply the toner that is a powder and is contained in the toner containers 32Y, 32M, 32C, and 32K to developing devices 50Y, 50M, 50C, and 50K of the image forming units 46Y, 46M, 46C, and 46K. In the present embodiment, the four image forming units 46Y, 46M, 46C, and 46K make up an image forming device.

The printer unit 100 further includes an exposure device 47 as a latent image forming unit below the four image forming units 46. The exposure device 47 exposes and scans the surfaces of photoconductors 41Y, 41M, 41C, and 41K, which serve as image bearers as will be described later in detail, based on the image data of document images read by the scanner unit 400, to form electrostatic latent images on the surfaces of the photoconductors 41Y, 41M, 41C, and 41K, respectively. The image data may be either read by the scanner unit 400 or input from an external device such as a personal computer connected to the copier 500. Although the exposure device 47 according to the present embodiment employs laser beam scanning using a laser diode, a different method that employs, for example, a light-emitting diode (LED) array may be adopted.

Figure 2:
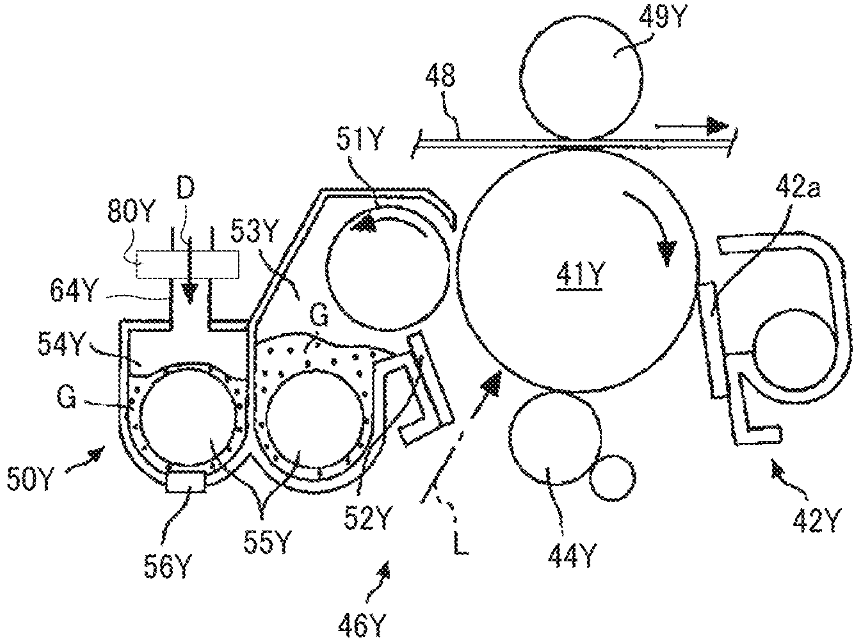
FIG. 2 is a diagram illustrating a configuration or structure of the developing device of FIG. 1, according to an embodiment of the present disclosure.

FIG. 2 is a diagram illustrating a schematic configuration of the image forming unit 46Y that handles the yellow toner image, according to the present embodiment.

The image forming unit 46Y is provided with a drum-shaped photoconductor 41Y. In the image forming unit 46Y, for example, a charging roller 44Y serving as a charging device, a developing device 50Y, a photoconductor cleaning device 42Y to clean the photoconductor 41Y, and an electric-charge removing device are arranged around the photoconductor 41Y. A series of image forming processes including a charging process, an exposure process, a developing process, a transfer process, and a cleaning process are performed on the photoconductor 41Y. As a result, a yellow toner image is formed on the surface of the photoconductor 41Y.

The other three image forming units 46M, 46C, and 46K have a similar configuration to that of the yellow image forming unit 46Y except for the color of the toner used therein and form toner images of the respective colors on the photoconductors 41M, 41C, and 41K. In the following description, only the image forming unit 46Y that handles yellow toner is described, and the description of the other three image forming units 46M, 46C, and 46K are omitted where appropriate.

The photoconductor 41Y is driven by a drive motor to rotate clockwise in FIG. 2. The surface of the photoconductor 41Y is evenly charged by the charging roller 44Y at a position facing the charging roller 44Y. Such a process I referred to as a charging process. When the photoconductor 41Y reaches a position to receive the laser beam L emitted from an exposure device 47, the photoconductor 41Y is scanned with the laser beam L, and thus an electrostatic latent image for yellow is formed thereon.

Such a process is referred to as an exposure process. Then, the photoconductor 41Y reaches a position facing the developing device 50Y, where the electrostatic latent image is developed with yellow toner into a yellow toner image. Such a process is referred to as a developing process.

The four primary-transfer bias rollers 49Y, 49M, 49C, and 49K of the intermediate transfer unit 85 sandwich the intermediate transfer belt 48 with the corresponding photoconductors 41Y, 41M, 41C, and 41K, respectively, to form primary transfer nips therebetween. To the primary-transfer bias rollers 49Y, 49M, 49C, and 49K, a primary transfer bias whose polarity is opposite to the polarity of the electric charge of the toner is applied.

When the surface of the photoconductor 41Y on which the toner image has been formed in the developing process reaches the position facing the primary-transfer bias roller 49Y across the intermediate transfer belt 48, the toner image is transferred from the photoconductor 41Y onto the intermediate transfer belt 48 in the primary transfer nip.
Such a transferring process is referred to as a primary transferring process. In this step, a small amount of toner remains untransferred on the photoconductor 41Y. After the toner image is transferred onto the intermediate transfer belt 48 at the primary transfer nip, the surface of the photoconductor 41Y reaches a position facing the photoconductor cleaning device 42Y. The untransferred toner remaining on the photoconductor 41Y is mechanically collected by a cleaning blade 42*a* of the photoconductor cleaning device 42Y at the position facing the photoconductor cleaning device 42Y (cleaning process). Finally, the surface of the photoconductor 41Y reaches a position facing the electric-charge removing device, and the residual potential on the photoconductor 41Y is removed at that position.
In this way, a series of image forming processes performed on the photoconductor 41Y is completed.

Such a series of image forming processes is also performed in the other image forming units 46M, 46C, and 46K in a similar manner to the image forming unit 46Y that handles yellow toner. In other words, the exposure device 47 disposed below the image forming units 46M, 46C, and 46K irradiates photoconductors 41M, 41C, and 41K of the image forming units 46M, 46C, and 46K with laser beams L based on image data. More specifically, the exposure device 47 includes light sources to emit the laser beams L, a plurality of optical elements, and a polygon mirror that is rotated by a motor. The exposure device 47 uses the optical elements to irradiate the photoconductors 41M, 41C, and 41K with the laser beams L while deflecting the laser beams L with a polygon mirror. Then, after the developing process, the multicolor toner images are transferred from the photoconductors 41M, 41C, and 41K onto the intermediate transfer belt 48 and superimposed on top of one another.

While rotating and moving in the direction indicated by the arrow illustrated in FIG. 1 and FIG. 2, the intermediate transfer belt 48 sequentially passes through the primary transfer nips of the primary-transfer bias rollers 49Y, 49M, 49C, and 49K. Thus, multicolor toner images including yellow, magenta, cyan, and black toner images are primarily transferred from the photoconductors 41Y, 41M, 41C, and 41K to the intermediate transfer belt 48 on top of one another to form a color toner image on the intermediate transfer belt 48.

The intermediate transfer belt 48, to which a color toner image has been formed upon transferring multicolor toner images thereto and superimposing those toner images on top of one another, reaches a position facing a secondary transfer roller 89 arranged opposite the secondary-transfer backup roller 82. At this position, the secondary-transfer backup roller 82 sandwiches the intermediate transfer belt 48 with the secondary transfer roller 89 to form a secondary transfer nip. The color toner image formed on the intermediate transfer belt 48 is transferred onto a recording medium P such as a transfer sheet conveyed to the position of the secondary transfer nip, for example, by the action of a transfer bias applied to the secondary-transfer backup roller 82. In such a transferring process, the untransferred toner that failed to be transferred to the recording medium P remains on the intermediate transfer belt 48. The intermediate transfer belt 48 having passed through the secondary transfer nip reaches the position of an intermediate transfer cleaning device, and untransferred toner on the surface of the intermediate transfer belt 48 is collected. Thus, a series of transfer processes that are performed on the intermediate transfer belt 48 ends.

The movement of the recording medium P is described below. The recording medium P is conveyed from a sheet tray 26 of a sheet feeder 200 arranged below the printer unit 100 to the above-described secondary transfer nip through, for example, a sheet feed roller 27 and a registration roller pair 28.
More specifically, a plurality of recording media P are stacked and stored in the sheet tray 26. When the sheet feed roller 27 is driven to rotate counterclockwise in FIG. 1, the uppermost recording medium P is conveyed toward a roller nip formed by two rollers of the registration roller pair 28.

The recording medium P conveyed to the registration roller pair 28 is temporarily stopped at the position of the roller nip of the registration roller pair 28 that has stopped rotating. The registration roller pair 28 is driven to rotate in accordance with the timing at which the color toner image on the intermediate transfer belt 48 reaches the secondary transfer nip. Accordingly, the recording medium P is conveyed toward the secondary transfer nip.
Thus, a multicolor toner image is transferred onto the recording medium P as desired.

The recording medium P onto which the color toner image has been transferred at the secondary transfer nip is conveyed to the position of a fixing device 86. In the fixing device 86, the color toner image transferred to the surface of the recording medium P is fixed onto the recording medium P by heat and pressure from a fixing belt and a pressure roller. The recording medium P having passed through the fixing device 86 is ejected to the outside of the copier 500 through the roller nip of an output roller pair 29. The recording medium P ejected to the outside of the copier 500 by the output roller pair 29 is sequentially stacked on the stacking unit 30 as an output image. Thus, a series of image forming processes performed in the copier 500 is completed.

A configuration and operation of one of the multiple developing devices 50Y, 50M, 50C, and 50K are described below in further detail. Each of the developing devices 50Y, 50M, 50C, and 50K is a developing unit that develops a toner image on the surface of one of the multiple photoconductors 41 in the four image forming units 46. Although the image forming unit 46Y that handles the yellow toner image is described by way of example in the present embodiment, the image forming units 46M, 46C, and 46K that handle toner of other colors have a configuration similar to those of the image forming unit 46Y and perform an operation similar to that of the image forming unit 46Y.

As illustrated in FIG. 2, the developing device 50Y according to the present embodiment includes, for example, a developing roller 51Y that serves as a developer bearer, a doctor blade 52Y that serves as a developer control plate, a pair of developer conveying screws 55Y, and a toner concentration sensor 56Y.

The developing roller 51Y faces the photoconductor 41Y, and the doctor blade 52Y faces the developing roller 51Y. The two developer conveying screws 55Y are arranged inside two developer storages including a first developer storage 53Y and a second developer storage 54Y. The developing roller 51Y includes, for example, a stationary inner magnet roller (or multiple magnets) and a sleeve that rotates around the magnet roller. The first developer storage 53Y and the second developer storage 54Y store developer G containing two components including carriers and toner. The second developer storage 54Y communicates, through an opening on the upper side thereof, with a downward toner conveyance path 64Y. In this way, the developing device 50Y also serves as a powder container that uses the first developer storage 53Y and the second developer storage 54Y to store the developer G, which is a powder for image formation. The toner concentration sensor 56Y detects the degree of toner concentration in the developer G stored in the second developer storage 54Y.

Inside the developing device 50Y, the developer G is stirred by the two developer conveying screws 55Y and circulated between the first developer storage 53Y and the second developer storage 54Y. While being conveyed by one of the pair of developer conveying screws 55Y, the developer G in the first developer storage 53Y is attracted by the magnetic fields generated or formed by the magnet roller inside the developing roller 51Y, and is fed and borne onto the sleeve surface of the developing roller 51Y. The sleeve of the developing roller 51Y is driven to rotate in the counterclockwise direction as indicated by an arrow in FIG. 3, and the developer G that is borne on the developing roller 51Y moves on the developing roller 51Y with the rotation of the sleeve. Under such conditions, the toner particles in the developer G are charged through friction with carrier particles in the developer G to have a potential in the reversed polarity of the polarity of the carrier particles. Then, the toner particles are electrostatically attracted to the carrier particles, and are borne on the developing roller 51Y together with the carrier particles attracted by the magnetic field generated or formed on the developing roller 51Y.

The developer G that is borne on the developing roller 51Y is conveyed in a direction indicated by an arrow in FIG. 2 to a gap between the doctor blade 52Y and the developing roller 51Y. When the developer G on the developing roller 51Y passes through the gap between the doctor blade 52Y and the developing roller 51Y, the amount of the developer G is reduced to a desired amount. Then, the developer G is conveyed to a developing area that is a gap between the developing roller 51Y and the photoconductor 41Y. In the developing area, the toner in the developer G adheres to the latent image formed on the photoconductor 41Y due to the effect of the developing electric field generated between the developing roller 51Y and the photoconductor 41Y. As the sleeve rotates, the developer G that has passed through the developing region and remains on the surface of the developing roller 51Y reaches an area above the first developer storage 53Y and then drops from the developing roller 51Y.

The concentration of toner in the developer G that is contained in the developing device 50Y is adjusted within a predetermined range. More specifically, the toner supply device 60Y supplies the toner from the toner container 32Y to the second developer storage 54Y according to the consumption of the toner included in the developer G in the developing device 50Y. The developer conveying screws 55Y stir the toner supplied to the second developer storage 54Y, together with the developer G, and circulate the toner between the first developer storage 53Y and the second developer storage 54Y.

The toner supply devices 60Y, 60M, 60C, and 60K are described below in detail.

Figure 3:
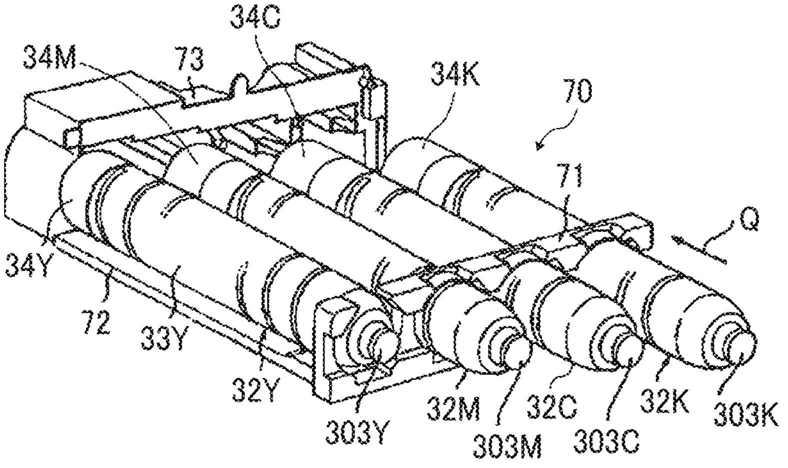
FIG. 3 is a diagram illustrating the shape of a container used to supply developer to the developing device illustrated in FIG. 2, according to an embodiment of the present disclosure.

FIG. 3 is a schematic perspective view of the four toner containers 32Y, 32M, 32C, and 32K arranged on the toner container holder 70, according to the present embodiment.

Figure 4:
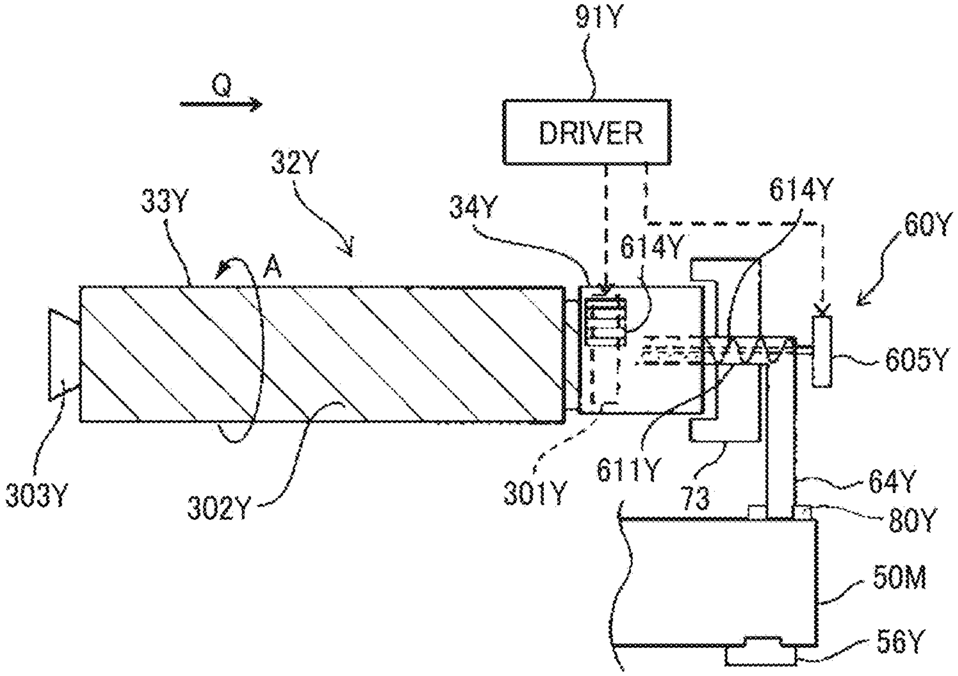
FIG. 4 is a diagram illustrating a configuration of a developer supply path of the developing device illustrated in FIG. 2.

FIG. 4 is a schematic diagram of the toner container 32Y attached to the toner supply device 60Y, according to the present embodiment.

The toner that is stored in the toner containers 32Y, 32M, 32C, and 32K attached to the toner container holder 70 of the printer unit 100 are supplied into the corresponding developing devices 50Y, 50M, 50C, and 50K as desired according to the amount of toner consumption in the developing devices 50Y, 50M, 50C, and 50K each of which handles different color toner. In so doing, the toner supply devices 60Y, 60M, 60C, and 60K supply the toner of different colors from the toner containers 32Y, 32M, 32C, and 32K to the developing devices 50Y, 50M, 50C, and 50K, respectively. Among the four toner containers 32Y, 32M, 32C, and 32K, the toner container 32K containing black (K) toner has a size different from the sizes of the toner containers 32Y, 32M, and 32C containing yellow (Y) toner, magenta (M) toner, and cyan (C) toner. In particular, the toner container 32K is formed to have a diameter wider than the diameters of the toner containers 32Y, 32M, and 32C. Due to such a configuration, the frequency of replacing the toner container 32K containing black toner, which is more frequently used than the other containers, can be reduced. When the toner containers 32Y, 32M, 32C, and 32K have different shapes depending on the colors as described above, the toner supply device 60K to which the toner container 32K containing black (K) toner is attached has a shape different from the shapes of the toner supply devices 60Y, 60M, and 60C to which the toner containers 32Y, 32M, and 32C containing yellow (Y) toner, magenta (M) toner, and cyan (C) toner are attached depending on the shapes of the toner containers 32Y, 32M, 32C, and 32K.

Basically, the toner containers 32Y, 32M, 32C, and 32K have a similar configuration or structure in common except for their diameters and the color of the toner used in the image forming processes. Accordingly, only the toner supply device 60Y and the toner container 32Y that handle yellow (Y) color toner are described below, and descriptions of the toner supply devices 60M, 60C, and 60K and the toner containers 32Y, 32M, and 32C that handle color toner of the other three different colors are omitted as deemed appropriate. When the configuration or structure is different for each one of the colors, suffixes Y, M, C, and K are used as parts of the reference signs that indicate specific colors. However, when the configuration or structure is not different for each one of the colors or when the configuration or structure is in common with each other among the multiple colors, those suffixes Y, M, C, and K may be appended to the reference signs, or those suffixes may be omitted where appropriate.

Regarding the form of the toner container, for example, the toner container 32Y is a substantially cylindrical toner bottle as illustrated in FIG. 3. Typically, the toner container 32Y is a nonrotating container held in the toner container holder 70, and includes a front-end container cover 34Y as a container cover and a container body 33Y that serves as a powder container integrally molded with a container gear 301Y as a gear on the container side.

The container body 33Y is held to be rotatable relative to the front-end container cover 34Y. In other words, the container cover is a member that is rotatable relative to the gear on the container side.

As illustrated in FIG. 3, typically, the toner container holder 70 includes a container-cover receiver 73, a container receiver 72, and an insertion-slot forming unit 71. The container-cover receiver 73 holds the front-end container cover 34Y and the container body 33Y of the toner container 32Y. The container receiver 72 supports the container body 33Y of the toner container 32Y. The insertion-slot forming unit 71 forms an insertion slot 71*a* into which the toner container 32Y is inserted during the mounting operation. When the front cover of the copier 500 (on the front side of the plane in FIG. 1) is opened, the insertion-slot forming unit 71 of the toner container holder 70 is exposed. Then, the multiple toner containers 32Y, 32M, 32C, and 32K are attached or detached from the front side of the copier 500 with the longer-side direction of the multiple toner containers 32Y, 32M, 32C, and 32K kept horizontal. In such attachment and detachment, the longitudinal direction of the toner containers 32Y, 32M, 32C, and 32K is parallel to a direction in which the toner containers 32Y, 32M, 32C, and 32K are attached to or detached from the toner container holder 70.

The length of the container receiver 72 in the longitudinal direction is approximately equal to the length of the container body 33Y in the longitudinal direction. The container-cover receiver 73 is arranged at one end of the container receiver 72 where the front end of the toner container 32Y is placed, in the longitudinal direction (or the attachment and detachment direction) of the container receiver 72. The insertion-slot forming unit 71 is arranged at the other end of the container receiver 72 in the longitudinal direction of the container receiver 72. Each of the four toner containers 32Y, 32M, 32C, and 32K are slidable on the container receiver 72. Accordingly, in the mounting operation of the toner container 32Y, the front-end container cover 34Y passes through the insertion-slot forming unit 71, slides on the container receiver 72 for a certain distance, and is then attached to the container-cover receiver 73.

As illustrated in FIG. 4, the front-end container cover 34Y is attached to the container-cover receiver 73, and the container gear 301Y that is a gear provided for the container body 33Y is driven to rotate by a driving unit 91Y as a driver to rotate the container through a container drive gear 601Y as a gear on the container body side. the driving unit 91Y consists of, for example, a drive motor and a gear.

Accordingly, the container body 33Y is driven to rotate in the direction indicated by an arrow A in FIG. 4. The container body 33Y has a spiral rib 302Y formed in a spiral shape on the inner surface of the container body 33Y. As the container body 33Y rotates, the spiral rib 302Y conveys the toner stored in the container body 33Y from one end to the other end (e.g., from the left end to the right end in FIG. 4) in the longitudinal direction of the container body 33Y. Thus, the toner is supplied from the front-end container cover 34Y arranged at the other end into the downward toner conveyance path 64Y through the conveyance nozzle 611Y.

As illustrated in FIG. 4, the toner supply devices 60Y, 60M, 60C, and 60K include, for example, the toner container holder 70, conveyance nozzles 611Y, 611M, 611C, and 611K as conveying tubes, conveying screws 614Y, 614M, 614C, and 614K as conveyance members, downward toner conveyance paths 64Y, 64M, 64C, and 64K, and driving units 91Y, 91M, 91C, and 91K as drivers to rotate containers. When the toner container 32Y is moved inside the toner container holder 70 of the printer unit 100 by the mounting operation where the toner container 32Y is pushed in the mounting direction indicated by an arrow Q in FIG. 3 and FIG. 4, the conveyance nozzle 611Y of the toner supply device 60Y is inserted from the front end of the toner container 32Y in the mounting direction in conjunction with the mounting operation. Accordingly, the toner container 32Y internally communicates with the conveyance nozzle 611Y, and the toner is conveyed to the downward toner conveyance path 64Y as the conveying screw 614Y rotates. As a result, the toner drops and is supplied into the second developer storage 54Y of the developing device 50Y.

A conveying screw 614Y is arranged inside the conveyance nozzle 611Y. The conveying screw 614Y rotates as a conveyance screw gear 605Y is driven to rotate by the driving unit 91Y as a driver to rotate the container, and conveys the toner supplied into the conveyance nozzle 611Y. The downstream end of the conveyance nozzle 611Y in the conveyance direction is connected to the downward toner conveyance path 64Y. The toner that is conveyed by the conveying screw 614Y falls off by its own weight along the downward toner conveyance path 64Y, and is supplied into the second developer storage 54Y of the developing device 50Y. Each of the toner containers 32Y, 32M, 32C, and 32K is replaced when the service life thereof has expired, that is, when almost all the toner in each one of the toner containers 32Y, 32M, 32C, and 32K has been consumed. A grip 303 is arranged at each end of the toner containers 32Y, 32M, 32C, and 32K in the longitudinal direction opposite the front-end container cover 34Y. As an operator grasps the grip 303 and pulls out, the attached toner containers 32Y, 32M, 32C, and 32K can be removed for replacement.

In the toner supply device 60Y according to the present embodiment, the amount of toner to be supplied to the developing device 50Y is controlled with the revolutions per minute (rpm) of the conveying screw 614Y. Accordingly, the toner that has passed through the conveyance nozzle 611Y is directly conveyed to the developing device 50Y through the downward toner conveyance path 64Y without restricting the amount of toner to be supplied to the developing device 50Y. As described above, the downward toner conveyance path 64Y serves as a powder supply path and supplies toner, which is a powder used to form an image, to the developing device 50Y.

In such a configuration or structure where the toner container 32Y or the toner supply device 60Y are used to supply the toner to the developing device 50Y, for example, the toner container 32Y is replaced. Alternatively, the developing device 50Y may also be detachable from the copier 500 for various kinds of maintenance or replacement.

Figure 5:
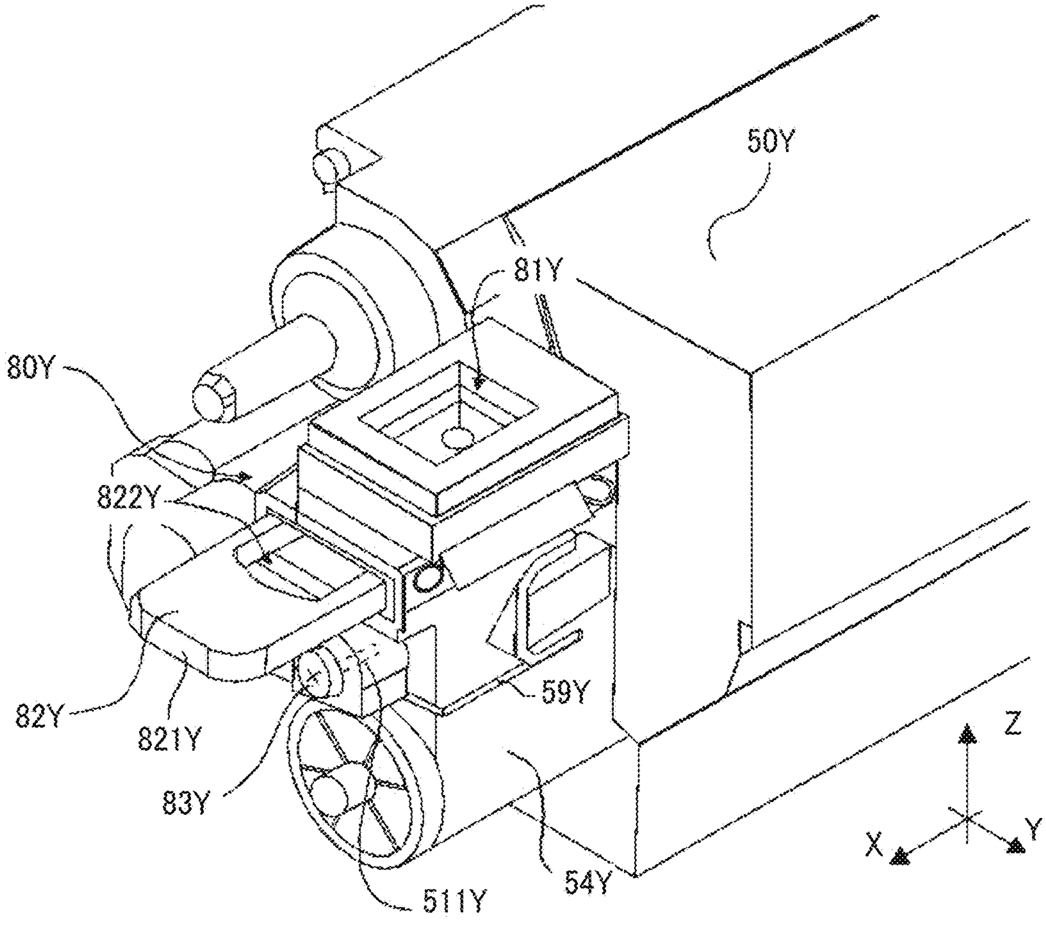
FIG. 5 is a diagram illustrating a configuration or structure of the shutter mechanism illustrated in FIG. 4, according to an embodiment of the present disclosure.

In cases where the developing device 50Y is detachable as described above, it is desired that the opening of the developing device 50Y be well shut and closed to prevent the toner from leaking even when the developing device 50Y is detached from the copier 500. In order to handle such a situation, in the present embodiment, a shutter unit 80Y that serves as a shutter mechanism as illustrated in FIG. 5 is arranged at the boundary between the downward toner conveyance path 64Y and the developing device 50Y. In addition to the shutter unit 80Y, shutter units 80M, 80C, and 80K of other different colors that correspond to the developing devices 50M, 50C, and 50K of other different colors are arranged. However, the configuration or structure of those elements is in common, and overlapping descriptions are omitted where appropriate.

The shutter unit 80Y according to the present embodiment has an opening 81Y communicating with the second developer storage 54Y of the developing device 50Y, and an opening and closing part 82Y that is attached to the opening 81Y and slides in the X-axis direction in FIG. 5 to open or close the opening 81Y. The shutter unit 80Y according to the present embodiment is fixed as a screw 83Y that serves as a fixation member is fastened to a screw hole 511Y formed on a wall of the developing device 50Y in the X-axis direction.

As will be described later in detail with reference to FIG. 7, a first projecting part 57Y that is a projecting part shaped like a boss and formed so as to extend in the +X-axis direction, a second projecting part 58Y that is a ridge formed on a wall of the developing device 50Y in the Y-axis direction to extend in the +X-axis direction, and a guide 59Y arranged on a wall in the Y-axis direction to support the bottom edge of the shutter unit 80Y are arranged on one side of the developing device 50Y to which the shutter unit 80Y is to be attached in the X-axis direction.

The opening and closing part 82Y is a shutter having a shutter opening 822Y that is orthogonal to the opening 81Y and held in a slidable manner in the X-axis direction.

The opening and closing part 82Y is attached to and fixed to the developing device 50Y. When the developing device 50Y is detached from the housing of the copier 500, the opening and closing part 82Y is pressed such that a front end 821Y of the shutter protrudes in the +X-axis direction and enters a closed state as illustrated in FIG. 5.

Figure 6:
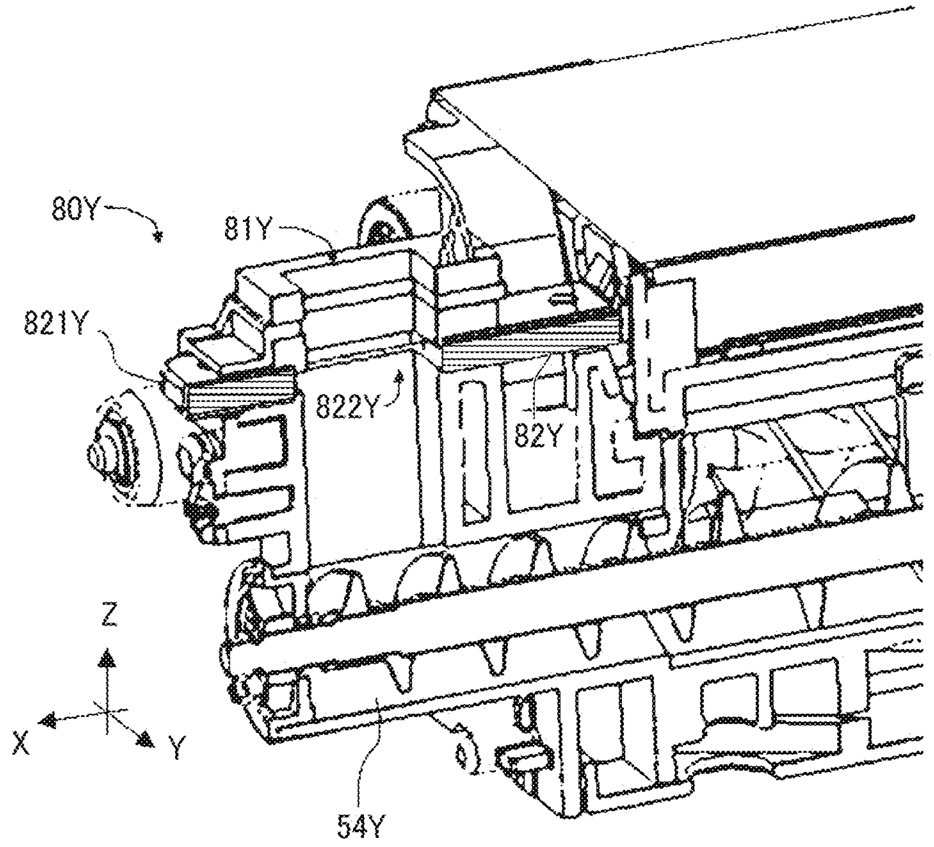
FIG. 6 is a diagram illustrating how a shutter mechanism operates when attached to a developing device, according to an embodiment of the present disclosure.

By contrast, when the developing device 50Y is attached to the copier 500, the developing device 50Y is inserted into the housing of the copier 500 in the +X-axis direction. Accordingly, the front end 821Y of the shutter contacts the housing of the copier 500, and the front end 821Y of the shutter is pushed in the −X-axis direction by the load of attachment. In an open state where the front end 821Y of the shutter is pushed in the −X-axis direction, as the cross section in the open state is illustrated in FIG. 6, the shutter opening 822Y communicates with the opening 81Y.

Accordingly, the toner drops off without blocking the downward toner conveyance path 64Y. As described above, in the present embodiment, as the opening and closing part 82Y slides in the ±X-axis direction, the shutter unit 80Y can open and close the downward toner conveyance path 64Y.

Figure 7:
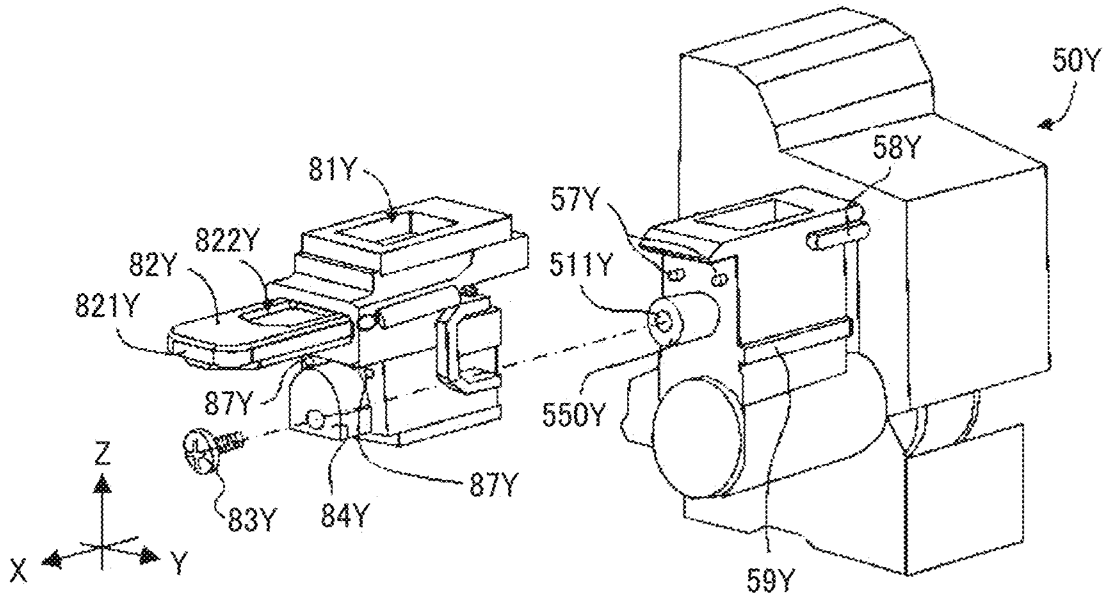
FIG. 7 is a diagram illustrating a shutter mechanism removed from a developing device, according to an embodiment of the present disclosure.

FIG. 7 is a diagram illustrating the shutter unit 80Y detached from the developing device 50Y, according to the present embodiment.

Figure 8:
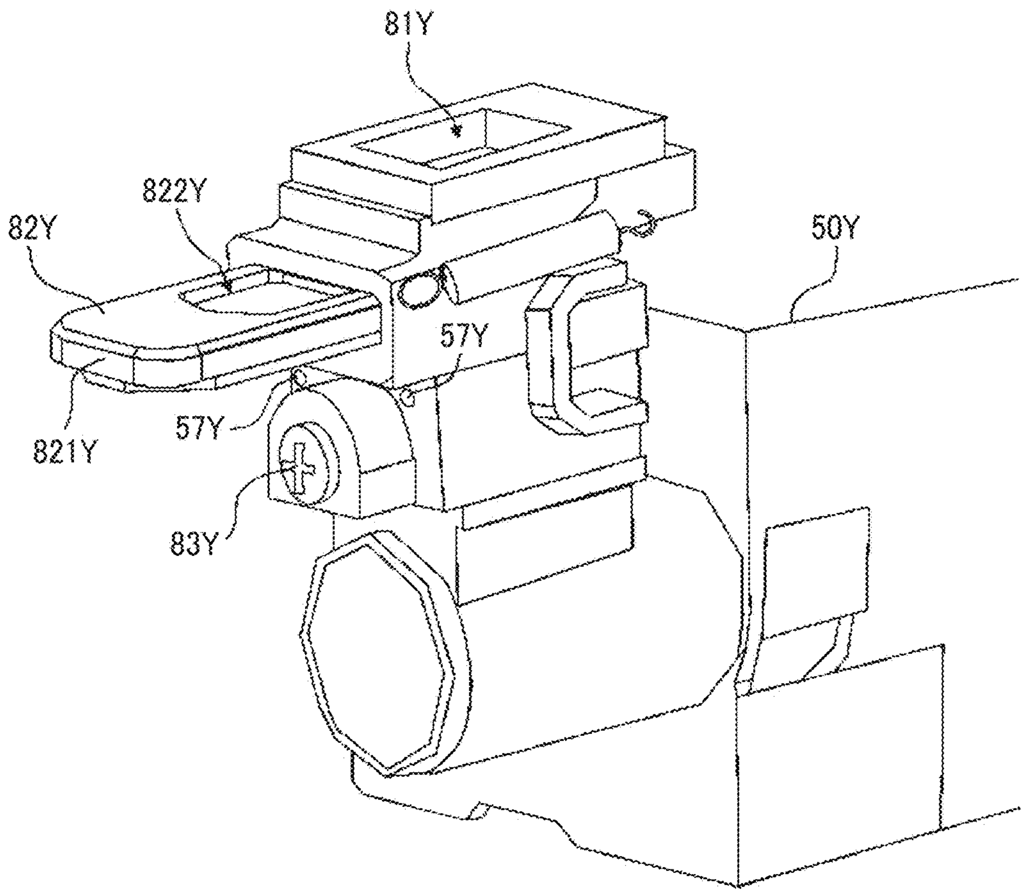
FIG. 8 is a diagram illustrating a shutter mechanism attached to a developing device, according to an embodiment of the present disclosure.

FIG. 8 is a diagram illustrating the shutter unit 80Y attached to the developing device 50Y, according to the present embodiment.

The screw hole 511Y that is formed on the developing device 50Y side is formed at the center of a cylindrical projecting part below the first projecting part 57Y. Firstly, the screw hole 511Y contacts the screw seat 84Y that serves as a butt face of the shutter unit 80Y.
Then, the screw 83Y is fastened to the screw hole 511Y to fix the shutter unit 80Y and the developing device 50Y.
The position of the screw hole 511Y protrudes more than the front end of the first projecting part 57Y in the +X-axis direction.

Figure 9:
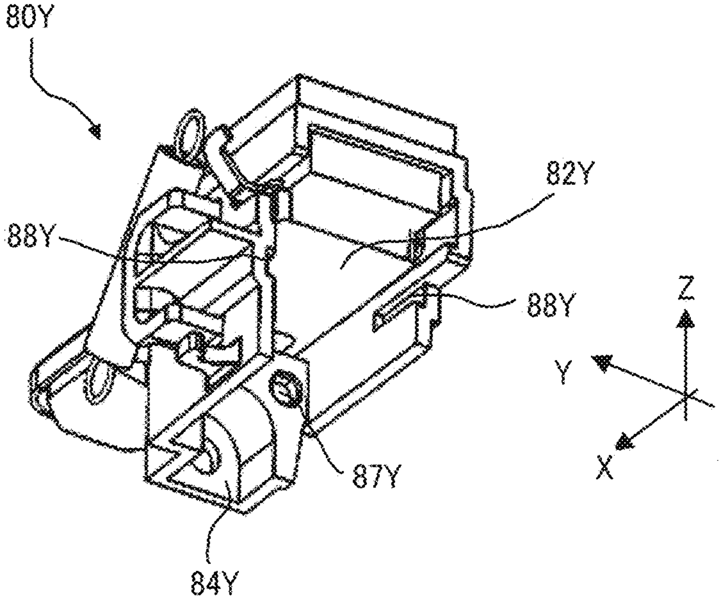
FIG. 9 is a diagram illustrating the relative positions of multiple elements when a shutter mechanism is viewed from a different angle, according to an embodiment of the present disclosure.

FIG. 9 is a perspective view of the shutter unit 80Y viewed in the −X-axis direction to illustrate the relative positions of multiple elements, according to the present embodiment.

As illustrated in FIG. 9, a first fitting part 87Y that engages with the first projecting part 57Y to determine the relative positions of the shutter unit 80Y and the developing device 50Y when the shutter unit 80Y is attached to the developing device 50Y is formed on a face of the shutter unit 80Y arranged on the side in the −X-axis direction facing the first projecting part 57Y.

Figure 10A:
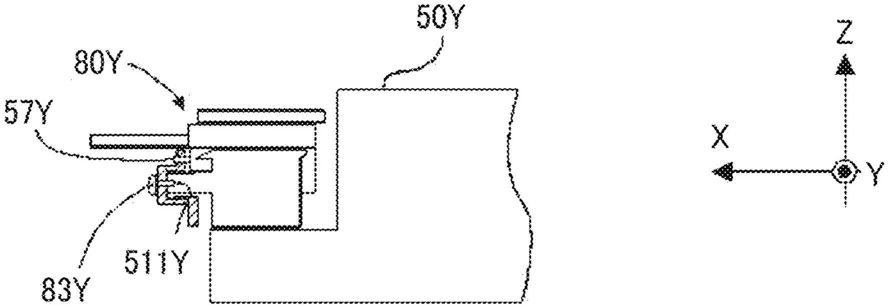
FIG. 10A and FIG. 10B are diagrams illustrating how a shutter mechanism is attached, according to a comparative example of the present disclosure.
Figure 10B:
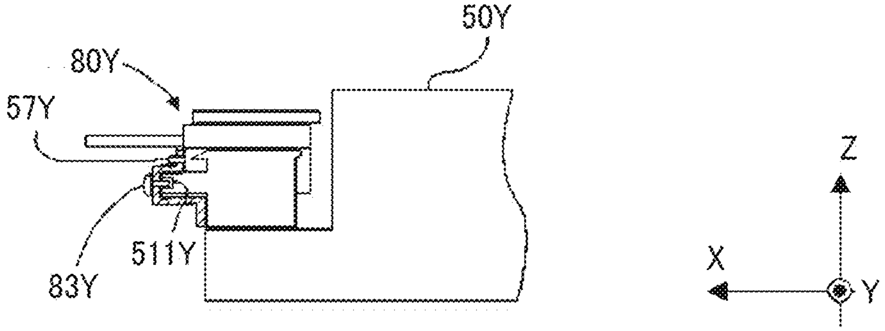

FIG. 10A and FIG. 10B are diagrams illustrating how the shutter mechanism 80 is attached, according to a comparative example of the present disclosure.

The relative positions of the first projecting part 57Y and the first fitting part 87Y are determined as the first projecting part 57Y that has a cylindrical shape engages with the first fitting part 87Y that is a hole. However, as illustrated in FIG. 10A in an exaggerated manner, the surface on which the first projecting part 57Y is formed does not touch or contact the surface on which the first fitting part 87Y is formed.
Firstly, the screw seat 84Y contacts the surface on which the screw hole 511Y is formed having a certain gap therebetween.

If the first projecting part 57Y contacts the first fitting part 87Y without engagement when the screw 83Y is fastened to the screw hole 511Y, for example, the installation position of the shutter unit 80Y may be displaced, or the shutter unit 80Y may be attached with some inclination, which are problematic.

As illustrated in FIG. 10B, if the surface on which the first fitting part 87Y is formed touches or contacts the surface on which the first projecting part 57Y is formed when the screw 83Y is fastened to the screw hole 511Y, the shutter unit 80Y contacts the developing device 50Y on a plurality of faces or surfaces in the X-axis direction in an undesired manner. In such cases, the shutter unit 80Y and the developing device 50Y may be distorted or deformed, and the installation position or posture of the shutter unit 80Y may be displaced, which are problematic.

In the present embodiment, the shutter unit 80Y contacts the developing device 50Y only through the screw seat 84Y in the X-axis direction where the shutter unit 80Y opens and closes, and the shutter unit 80Y can be fixed to the developing device 50Y where the YZ plane formed by the screw seat 84Y serves as a reference plane for the positioning.

Figure 11:
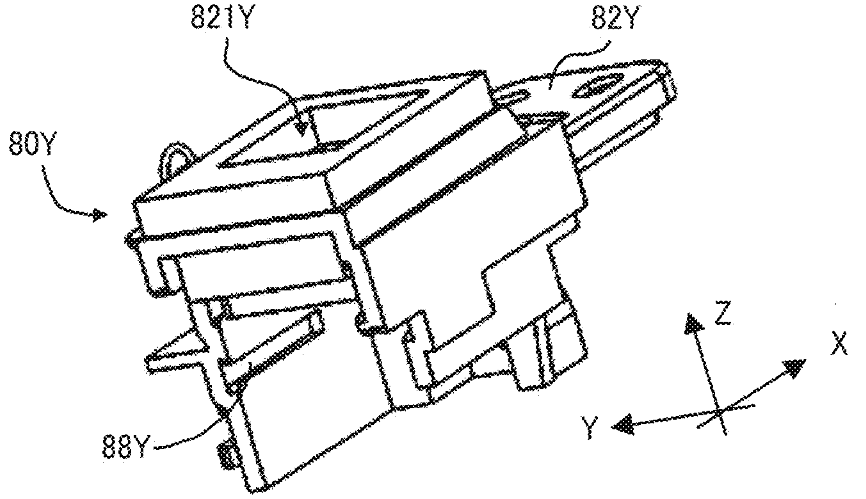
FIG. 11 is a diagram illustrating the relative positions of multiple elements when a shutter mechanism is viewed from a different angle, according to an embodiment of the present disclosure.

In the present embodiment, as illustrated in FIG. 11, a second fitting part 88Y that corresponds to the second projecting part 58Y is formed on the shutter unit 80Y. As described above, the second fitting part 88Y engages with the second projecting part 58Y that extends in the +X-axis directions. Due to such a configuration, the position of the shutter unit 80Y is restricted so as to be movable only in the X-axis direction when the shutter unit 80Y is attached to the developing device 50Y. As the first projecting part 57Y engages with the first fitting part 87Y and the second projecting part 58Y engages with the second fitting part 88Y, the position of the shutter unit 80Y relative to the developing device 50Y in the Y-axis direction and Z-axis direction intersecting with the X-axis direction can be determined by the first fitting part 87Y and the second fitting part 88Y. In other words, as the first projecting part 57Y is inserted into the first fitting part 87Y, the movement of the shutter unit 80Y with respect to the developing device 50Y along the YZ plane is restricted. As the second projecting part 58Y engages with the second fitting part 88Y, the shutter unit 80Y according to the present embodiment can smoothly be moved in the X-axis direction in which the second projecting part 58Y extends, but the movement of the shutter unit 80Y along the YZ plane is restricted.

Due to such a configuration as described above, the shutter unit 80Y is precisely positioned and fixed with reference to the developing device 50Y.

The developing device 50Y to which the shutter unit 80Y is attached can be removed from the copier 500 by moving the developing device 50Y in the −X-axis direction. As described above, in the present embodiment, the X-axis direction in which the butt face is to contact the developing device 50Y, the engaging direction of each one of the first fitting part 87Y and the second fitting part 88Y, and a direction in which the opening and closing part 82Y opens are the same and parallel to each other.

Due to such a configuration, the shutter unit 80Y can easily be attached or detached without requiring a large amount of force at the time of attachment and detachment, and the opening 81Y can be released just by pushing the shutter unit 80Y in the X-axis direction at the time of attachment.

In the present embodiment, the first fitting part 87Y and the second fitting part 88Y that can position the shutter unit 80Y when the shutter unit 80Y is attached to the developing device 50Y are provided, and the first fitting part 87Y and the second fitting part 88Y are arranged at a plurality of different positions in the open or close direction. This is a mechanism to prevent the shutter unit 80Y from rotating as moved by the force in the rotation direction when the shutter unit 80Y is inserted into the developing device 50Y in the X-axis direction.

By way of example, a shutter unit 800Y that has only one fitting part 801Y in the X-axis direction, according to a comparative example of the above embodiments of the present disclosure, is described below with reference to FIG. 12A and FIG. 12B.

Figure 12A:
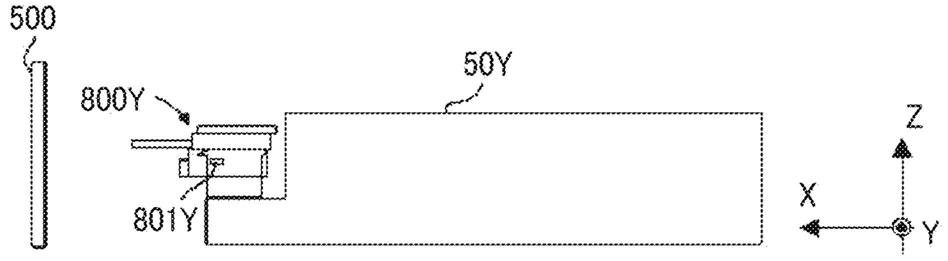
FIG. 12A and FIG. 12B are diagrams illustrating how a shutter mechanism having only one fitting part operates, according to a comparative example of the above embodiments of the present disclosure.
Figure 12B:
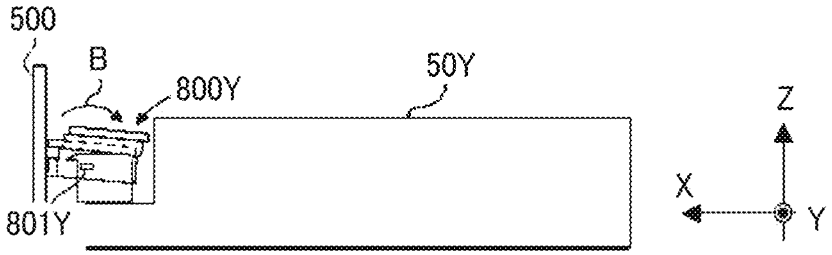

When the developing device 50Y and the shutter unit 800Y are viewed in the Y-axis direction as illustrated in FIG. 12A and FIG. 12B, once the opening and closing part 82Y is pressed in the −X-axis direction by the housing of the copier 500, the shutter unit 800Y is also biased in a clockwise direction around the fitting part 801Y as indicated by an arrow B in FIG. 12A and FIG. 12B. Accordingly, simple provision of the fitting part 801Y may make the shutter unit 800Y pivot about the fitting part 801Y as illustrated in FIG. 12A and FIG. 12B, in an unintentional manner.

Figure 13A:
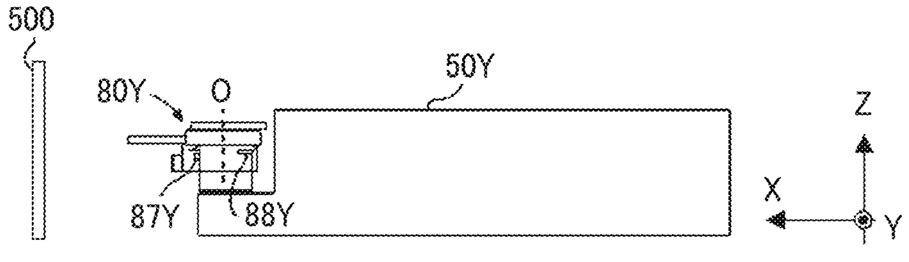
FIG. 13A and FIG. 13B are diagrams illustrating how a shutter mechanism having a pair of fitting parts operates, according to an embodiment of the present disclosure.
Figure 13B:
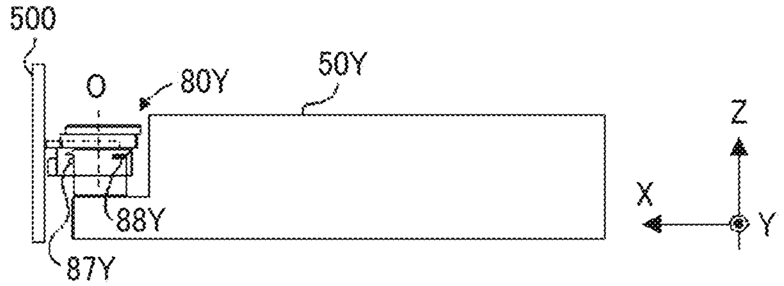

In order to handle such a situation, in the present embodiment, as described above with reference to, for example, FIG. 7, FIG. 13A, and FIG. 13B, the first fitting part 87Y and the second fitting part 88Y are arranged at a plurality of different positions in the X-axis direction parallel to the open or close direction of the shutter unit 80Y. More specifically, the first fitting part 87Y is arranged at a portion of the shutter unit 80Y in the +X-axis direction, and the second fitting part 88Y is arranged at a portion of the shutter unit 80Y in the −X-axis direction. As described above, even if the shutter unit 80Y rotates on the XZ plane in the direction indicated by an arrow B in FIG. 12B, arranging a plurality of fitting parts including the first fitting part 87Y and the second fitting part 88Y in the X-axis direction can prevent the shutter unit 80Y from rotating around the other fitting part. In other words, as a plurality of fitting parts are arranged at a plurality of positions in the X-axis direction as in the embodiments of the present disclosure, the rotation of the shutter unit 80Y can be controlled during the attachment of the developing device 50Y.

In this configuration, it is desired that the first fitting part 87 and the second fitting part 88Y be positioned across the center of the opening 81Y in the X-axis direction when fitted to the developing device 50Y.

Due to such a configuration, the rotational load on the shutter unit 80Y caused when the opening and closing part 82Y contacts the housing of the copier 500 is canceled between the first fitting part 87Y side and the second fitting part 88Y side, and the rotation of the shutter unit 80Y can be controlled during the attachment of the developing device 50Y.

In the present embodiment, the screw 83Y that serves as a fixation member and is used to fix the shutter unit 80Y to the developing device 50Y with the screw seat 84Y contacting the developing device 50Y, and the screw hole 511Y that serves as a hole and is formed on the developing device 50Y to engage with the screw 83Y are provided, and the screw hole 511Y extends parallel to the open or close direction.

Due to such a configuration, the screw seat 84Y is clamped between the screw 83Y and the screw hole 511Y, and the shutter unit 80Y is fixed to the developing device 50Y.

In the present embodiment, when the shutter unit 80Y is attached to the developing device 50Y and the screw seat 84Y contacts the developing device 50Y, the first fitting part 87Y and the second fitting part 88Y are separated from the developing device 50Y in the open or close direction.

Due to such a configuration, the position of the shutter unit 80Y in the X-axis direction is determined by the relative positions of the screw seat 84Y and the screw hole 511Y. Accordingly, the position of the shutter unit 80Y is precisely determined without being inclined with reference to the developing device 50Y.

In the present embodiment, the developing device 50Y has a receiving face 550Y that is orthogonal to a direction in which the opening and closing part 82Y opens and closes and contacts the shutter unit 80Y when the shutter unit 80Y is attached to the developing device 50Y.

Due to such a configuration, the position of the shutter unit 80Y in the X-axis direction is determined by the relative positions of the screw seat 84Y and the receiving face 550Y. Accordingly, the position of the shutter unit 80Y is precisely determined without being inclined with reference to the developing device 50Y.

In the present embodiment, the screw hole 511Y is formed on the screw seat 84Y so as to communicate with the receiving face 550Y of the developing device 50Y, and the screw seat 84Y is clamped between the screw 83Y and the developing device 50Y.

Due to such a configuration, the shutter unit 80Y is fixed to the developing device 50Y at one position in the X-axis direction, and thus positioning is performed with high accuracy.

The developing device 50Y has the guide 59Y disposed on a side face of the downward toner conveyance path 64Y in the X-axis direction, and the guide 59Y protrudes and determines the position of the shutter unit 80Y.

Due to such a configuration, when the shutter unit 80Y is attached to the developing device 50Y, the relative positions of the shutter opening 822Y and the downward toner conveyance path 64Y in the height direction can be determined with a high degree of precision. Moreover, as the shutter unit 80Y is guided straight by the guide 59Y in the +X-axis direction, the screw seat 84Y and the screw hole 511Y are not easily misaligned.

First Aspect

As described above, the shutter units 80Y, 80M, 80C, and 80K each of which serves as the shutter mechanism according to the above embodiments of the present disclosure are detachably attached to the developing devices 50Y, 50M, 50C, and 50K that contains the developer G, and the opening 81Y and openings 81M, 81C, and 81K, includes the opening and closing part 82Y and opening and closing parts 82M, 82C, and 82K attached to the opening 81Y, and openings 81M, 81C, and 81K and openable and closable, the first fitting part 87Y and first fitting parts 87M, 87C, and 87K disposed at one end with reference to the center of the opening 81Y in an open direction of the opening and closing part 82Y to move in the open direction to make engagement, and the second fitting part 88Y and second fitting parts 88M, 88C, and 88K disposed at another end opposite the one end with reference to the center O of the opening 81Y to move in the open direction to make engagement.

The first fitting part 87Y and the second fitting part 88Y are used for positioning with respect to the developing device 50Y in a direction intersecting with the open direction, and the shutter unit 80Y includes the screw seat 84Y orthogonal to the open direction, the screw seat 84Y contacting the developing device 50Y when the first fitting part 87Y and the second fitting part 88Y engages with the developing device 50Y. The screw seat 84Y contacts the developing device 50Y in the X-axis direction parallel to an engaging direction of the first fitting part 87Y and the second fitting part 88Y, and the open direction of the opening and closing part 82Y.

Due to such a configuration, at the time of attachment and detachment, for example, the pressing force is not necessary in directions other than the open direction of the shutter mechanism. Accordingly, the hermeticity increases, and the removal of the developing device and the port for toner supply from the housing of the image forming apparatus can smoothly be done.

Second Aspect

In addition to the configuration or structure as described in the first aspect of the present disclosure, the developing device 50Y according to the above embodiments of the present disclosure includes a screw such as the screw 83Y to fix a shutter unit such as the shutter unit 80Y to the developing device 50Y with the screw seat 84Y contacting the developing device 50Y, and the screw hole 511Y formed on the developing device 50Y to engage with a screw such as the screw 83Y.

The screw hole 511Y extends parallel to the X-axis direction.

Due to such a configuration, the fixation of the shutter unit such as the shutter unit 80Y to the developing device 50Y can be achieved at only one spot using a single screw such as the screw 83Y. Moreover, as such fixation is achieved only by fastening a screw in the X-axis direction, positional displacement or the like can be prevented as desired, and the relative positions of the developing device 50Y and the shutter unit such as the shutter unit 80Y can be determined with a high degree of precision. Since the direction in which the shutter unit such as the shutter unit 80Y is attached to the developing device 50Y is parallel to the direction in which the screw such as the screw 83Y is fastened, ease of assembly is enhanced as desired.

Further, since both the direction in which the developing device 50Y is attached to the housing of the image forming apparatus and the open direction of the opening and closing part 82Y are parallel to the X-axis direction, the shutter unit such as shutter unit 80Y can also be prevented from being detached. This is because the reaction force that is exerted by a spring, which biases the opening and closing part 82Y when the opening and closing part 82Y opens or closes, is also parallel to the X-axis direction.

Third Aspect

In addition to the configuration or structure according to the first aspect or the second aspect, in the developing device 50Y according to the above embodiments of the present disclosure, a shutter unit such as the shutter unit 80Y is attached to the developing device 50Y, and the first fitting part 87Y and the second fitting part 88Y are separated from the developing device 50Y in the open direction in a case that the screw seat 84Y contacts the developing device 50Y.

Due to such a configuration, a shutter unit such as the shutter unit 80Y can be attached to the developing device 50Y where only the YZ plane formed by the screw seat 84Y serves as a reference plane for the positioning, and a shutter unit such as the shutter unit 80Y can be prevented from being inclined with reference to the developing device 50Y when a shutter unit such as the shutter unit 80Y is attached to the developing device 50Y.

Fourth Aspect

In the developing device 50Y according to the fourth aspect, toner can externally be supplied as the developing device 50Y containing toner to form an image is inserted into the copier 500. The developing device 50Y has the downward toner conveyance path 64Y through which the toner is supplied to the developing device 50Y, and includes a shutter unit such as the shutter unit 80Y provided with the opening and closing part 82Y that is interposed between the developing device 50Y and the downward toner conveyance path 64Y to open and close between the downward toner conveyance path 64Y and the developing device 50Y.

The shutter unit such as the shutter unit 80Yf includes the opening 81Y connected to the downward toner conveyance path 64Y, and the opening and closing part 82Y attached to the opening 81Y and openable and closable. The X-axis direction into which the developing device 50Y is inserted is orthogonal to the Y-axis direction in which the downward toner conveyance path 64Y extends, and the X-axis direction is parallel to the open direction of the opening and closing part 82Y.

Due to such a configuration, at the time of attachment and detachment, for example, the pressing force is not necessary in directions other than the open direction of the shutter mechanism. Accordingly, the hermeticity increases, and the removal of the developing device and the port for toner supply from the housing of the image forming apparatus can smoothly be done.

Fifth Aspect

In addition to the configuration or structure according to the fourth aspect, the developing device 50Y according to the above embodiments of the present disclosure includes the receiving face 550Y orthogonal to the open direction of the opening and closing part 82Y, and the receiving face 550Y contacts a shutter unit such as the shutter unit 80Y when such a shutter unit such as the shutter unit 80Y is attached to the developing device 50Y.

Due to such a configuration, the relative positions of the developing device 50 and a shutter unit such as the shutter unit 80Y can be determined as the screw seat 84Y contacts the receiving face 550Y, and a shutter unit such as the shutter unit 80Y can be prevented from being inclined with reference to the developing device 50 when a shutter unit such as the shutter unit 80Y is attached to the developing device 50.

Sixth Aspect

In addition to the configuration or structure according to the fourth aspect or the fifth aspect, in the developing device 50Y according to the above embodiments of the present disclosure, the screw hole 511Y is formed on the receiving face 550Y, and the receiving face 550Y is clamped by a screw.

Due to such a configuration, the relative positions of the developing device 50Y and a shutter unit such as the shutter unit 80Y can be determined as the screw seat 84Y contacts the receiving face 550Y.
Moreover, the receiving face 550Y is clamped as a screw such as the screw 83Y is inserted into the screw hole 511Y. As a result, a shutter unit such as the shutter unit 80Y can be prevented from being inclined with reference to the developing device 50Y when a shutter unit such as the shutter unit 80Y is attached to the developing device 50Y.

Seventh Aspect

In addition to the configuration or structure according to any one of the fourth to sixth aspects, the developing device 50Y according to the above embodiments of the present disclosure includes the first fitting part 87Y and the second fitting part 88 that can position a shutter unit such as the shutter unit 80Y when a shutter unit such as the shutter unit 80Y is attached to the developing device 50Y. In the seventh aspect, the first fitting part 87Y and the second fitting part 88Y are arranged at a plurality of different positions in the open direction.

Due to such a configuration, when the shutter unit such as the shutter unit 80Y is inserted into the developing device 50Y in the X-axis direction, the shutter unit can be prevented from rotating as moved by the force in the rotation direction.

Eighth Aspect

In addition to the configuration or structure according to any one of the fourth to seventh aspects, the developing device 50Y according to the embodiments of the present disclosure includes the guide 59Y disposed on a side face of the downward toner conveyance path 64 extending in the open direction, and the guide protrudes from the side face to position a shutter unit such as the shutter unit 80Y.

Due to such a configuration, a shutter unit such as the shutter unit 80Y can be prevented from being inclined with reference to the developing device 50Y when a shutter unit such as the shutter unit 80Y is attached to the developing device 50Y.

The above-described embodiments of the present disclosure are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

By way of example, only the cases in which a shutter mechanism is provided for a developing device that is integrated into the printer unit 100 are described in the above embodiments of the present disclosure as a part of the copier 500. However, the embodiments of the present disclosure may be applied to other kinds of containers such as a toner bottle that can contain a powder. By way of example, a copier that adopts electrophotography to form an image on the recording medium P is described as an image forming apparatus in the above embodiments of the present disclosure.
However, the recording medium P is satisfactory as long as information or data can be recorded on the surface of the recording medium, and may be, for example, a sheet of paper, a thick sheet, coated paper, an overhead projector (OHP) transparency, a plastic film, a prepreg, and a copper foil.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. A shutter mechanism comprising:
an opening;
an opening and closing part attached to the opening and openable and closable;
a first fitting part disposed at one end with reference to a center of the opening in an open direction of the opening and closing part to move in the open direction to make engagement;
a second fitting part disposed at another end opposite the one end with reference to the center of the opening to move in the open direction to make engagement, the first fitting part and the second fitting part detachably attached to a powder container containing a powder used to form an image, the first fitting part and the second fitting part used for positioning in a direction intersecting with the open direction; and
a butt face orthogonal to the open direction, the butt face contacting the powder container when the first fitting part and the second fitting part engage with the powder container, the butt face contacting the powder container in a direction parallel to an engaging direction of the first fitting part and the second fitting part,
the engaging direction of the first fitting part and the second fitting part parallel to the open direction of the opening and closing part.

2. A powder container to which the shutter mechanism according to claim 1 is attached, the powder container comprising:
a fixation member to fix the shutter mechanism to the powder container with the butt face contacting the powder container; and
a hole formed on the powder container to engage with the fixation member,
wherein the hole extends parallel to the open direction.

3. The powder container according to claim 2,
wherein the shutter mechanism is attached to the powder container, and
wherein the first fitting part and the second fitting part are separated from the powder container in the open direction with the butt face contacting the powder container.

4. A developing device comprising:
a powder supply path through which powder used to form an image is supplied to a powder container containing the powder; and
a shutter mechanism including
an opening connected to the powder supply path, and
an opening and closing part attached to the opening and openable and closable, the opening and closing part interposed between the powder container and the powder supply path to open and close between the powder supply path and the powder container,
the powder container inserted into the developing device in a direction orthogonal to a direction in which the powder supply path extends,
the direction in which the powder container is inserted into the developing device parallel to an open direction of the opening and closing part.

5. The developing device according to claim 4,
wherein the developing device has a receiving face orthogonal to the open direction of the opening and closing part, and
wherein the receiving face contacts the shutter mechanism when the shutter mechanism is attached to the developing device.

6. The developing device according to claim 5,
wherein the receiving face has a hole, and
wherein the receiving face is clamped by a screw.

7. The developing device according to claim 6,
wherein the shutter mechanism includes a first fitting part and a second fitting part to position the shutter mechanism when the shutter mechanism is attached to the developing device, and
wherein the first fitting part and the second fitting part are disposed at a plurality of different positions in the open direction.

8. The developing device according to claim 4, further comprising
a guide disposed on a side face of the powder supply path extending in the open direction,
wherein the guide protrudes from the side face to position the shutter mechanism.

9. A shutter mechanism comprising:
an opening;
an opening and closing part attached to the opening and openable and closable;
a first fitting part disposed at one end with reference to a center of the opening in an open direction of the opening and closing part to move in the open direction to make engagement;
a second fitting part disposed at another end opposite the one end with reference to the center of the opening to move in the open direction to make engagement,
the first fitting part and the second fitting part detachably attached to a gate, the first fitting part and the second fitting part used for positioning in a direction intersecting with the open direction; and
a butt face orthogonal to the open direction, the butt face contacting the gate when the first fitting part and the second fitting part engages with the gate,
the butt face contacting the gate in a direction parallel to an engaging direction of the first fitting part and the second fitting part, the engaging direction of the first fitting part and the second fitting part parallel to the open direction of the opening and closing part.

* * * * *